US012683432B2

(12) United States Patent
Pinkos et al.

(10) Patent No.: US 12,683,432 B2
(45) Date of Patent: Jul. 14, 2026

(54) WIRELESS CHARGER WITH SELECTIVE FILTERING OF INTERFERENCE

(71) Applicant: AyDeeKay LLC, Aliso Viejo, CA (US)

(72) Inventors: Andrew F. Pinkos, Clarkston, MI (US);
Jeff Patterson, Aliso Viejo, CA (US);
Piotr Strycharski, Aliso Viejo, CA (US)

(73) Assignee: Ay Dee Kay, Aliso Viejo, CA (US)

( * ) Notice: Subject to any disclaimer, the term of this patent is extended or adjusted under 35 U.S.C. 154(b) by 0 days.

(21) Appl. No.: 18/789,419

(22) Filed: Jul. 30, 2024

(65) Prior Publication Data

US 2025/0047135 A1      Feb. 6, 2025

Related U.S. Application Data

(60) Provisional application No. 63/530,006, filed on Jul. 31, 2023.

(51) Int. Cl.
*H02J 50/00* (2016.01)
*H02J 50/10* (2016.01)

(52) U.S. Cl.
CPC ............ *H02J 50/005* (2020.01); *H02J 50/10* (2016.02)

(58) Field of Classification Search
CPC ............................... H02J 50/005; H02J 50/10
USPC .......................................................... 307/104
See application file for complete search history.

(56) References Cited

U.S. PATENT DOCUMENTS

| | | | | |
|---|---|---|---|---|
| 9,178,369 | B2 * | 11/2015 | Partovi | ................... H02J 50/90 |
| 9,934,895 | B2 * | 4/2018 | Konanur | ............. H01Q 1/2216 |
| 10,141,770 | B2 * | 11/2018 | Partovi | ................ B60L 53/126 |
| 10,886,790 | B2 * | 1/2021 | Ryu | ........................ H02J 50/12 |
| 2015/0372662 | A1 | 12/2015 | Niessen et al. | |
| 2016/0284465 | A1 * | 9/2016 | Maniktala | ............... H02J 50/12 |
| 2017/0094608 | A1 * | 3/2017 | Langer | ................ H04B 1/0057 |
| 2019/0081517 | A1 * | 3/2019 | Graham | ................... G01K 7/22 |
| 2019/0392984 | A1 * | 12/2019 | Han | ......................... H01F 38/14 |
| 2020/0373847 | A1 * | 11/2020 | Saha | ................. H02M 3/33576 |
| 2021/0002170 | A1 * | 1/2021 | Chien | ................... H05B 45/30 |
| 2022/0402384 | A1 * | 12/2022 | Asa | ....................... H02M 7/487 |
| 2023/0006543 | A1 * | 1/2023 | Lee | .......................... H03H 9/52 |

OTHER PUBLICATIONS

PCT Patent Appl. Serial No. PCT/US24/,040227, International Search Report and Written Opinion, Sep. 20, 2024.

* cited by examiner

*Primary Examiner* — Alfonso Perez Borroto
(74) *Attorney, Agent, or Firm* — Steven Stupp

(57) ABSTRACT

An integrated circuit is described. This integrated circuit may include wireless-charger transmitter. The wireless-charger transmitter includes a driver circuit. Moreover, the wireless-charger transmitter selectively filters out an interference signal in a band of frequencies corresponding to AM radio. Note that the selective filtering may be performed by at least a filtering circuit. For example, the filtering circuit may include a low-pass filter. Moreover, the selective filtering using the filtering circuit may be based at least in part on a switching frequency of the wireless-charger transmitter. Furthermore, a filtering frequency associated with the filtering circuit (such as a 3 dB cutoff frequency of a low-pass filter) may be adjusted by selectively electrically coupling a set of capacitors in parallel with the filtering circuit.

20 Claims, 3 Drawing Sheets

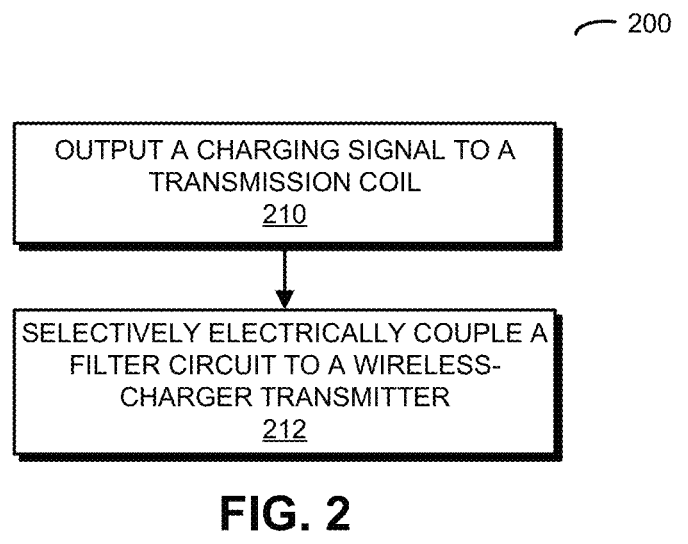

⌐ 200

```
┌─────────────────────────────────┐
│  OUTPUT A CHARGING SIGNAL TO A   │
│       TRANSMISSION COIL          │
│              210                 │
└─────────────────────────────────┘
                │
                ▼
┌─────────────────────────────────┐
│ SELECTIVELY ELECTRICALLY COUPLE A│
│   FILTER CIRCUIT TO A WIRELESS-  │
│      CHARGER TRANSMITTER         │
│              212                 │
└─────────────────────────────────┘
```

FIG. 2

WIRELESS CHARGER WITH SELECTIVE FILTERING OF INTERFERENCE

CROSS REFERENCE TO RELATED APPLICATIONS

This application claims priority under 35 U.S.C. 119(e) to U.S. Provisional Application Ser. No. 63/530,006, entitled "Wireless Charger with Selective Filtering of Interference," by Andy Pinkos, et al., filed on Jul. 31, 2023, the contents of which are herein incorporated by reference.

FIELD

The present disclosure relates to techniques for wireless charging using a wireless-charger transmitter.

BACKGROUND

Components may be removed from a wireless-charger transmitter (such as a wireless-charger transmitter that is compatible with a Qi2 standard, from the Wireless Power Consortium of Piscataway, New Jersey) in order to reduce cost and complexity. However, this can result in increased interference. For example, a switched wireless-charger transmitter may generate interference in a band of frequencies corresponding to amplitude modulated (AM) radio (e.g., 540 kHz to 1,700 kHz in the United States of America).

SUMMARY

Embodiments of an integrated circuit are described. This integrated circuit includes a wireless-charger transmitter, which includes a driver circuit. Moreover, the wireless-charger transmitter selectively filters out an interference signal in a band of frequencies corresponding to AM radio.

Note that the selective filtering may be performed by at least a filtering circuit. For example, the filtering circuit may include a low-pass filter.

Moreover, the selective filtering using the filtering circuit may be based at least in part on a switching frequency of the wireless-charger transmitter. For example, when the switching frequency is 128 kHz (such as the switching frequency associated with a Standard mode), the filtering circuit may be electrically coupled to the wireless-charger transmitter. More generally, the filtering circuit may be electrically coupled to the wireless-charger transmitter when the switching frequency is between 87 kHz to 205 kHz or is 360 kHz. Alternatively, when the switching frequency is 360 kHz (such as the switching frequency associated with a Magnetic Power Profile or MPP mode), the filtering circuit may be electrically decoupled from the wireless-charger transmitter. In some embodiments, the filtering circuit is selectively electrically coupled or decoupled using one or more switches (such as one or more FETs).

Furthermore, a filtering frequency associated with the filtering circuit (such as a 3 dB cutoff frequency of a low-pass filter) may be adjusted by selectively electrically coupling a set of capacitors in parallel with the filtering circuit. For example, the set of capacitors may include a parallel arrangement of one or more capacitors.

Additionally, the integrated circuit may include a half-bridge circuit that is electrically coupled to the driver circuit.

Another embodiment provides an electronic device that includes the integrated circuit.

Another embodiment provides a system that includes the integrated circuit.

Another embodiment provides a method for performing wireless charging. This method includes at least some of the operations performed by the wireless-charger transmitter.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

FIG. 2 is a flow diagram illustrating an example of a method for performing wireless charging according to some embodiments of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1A:
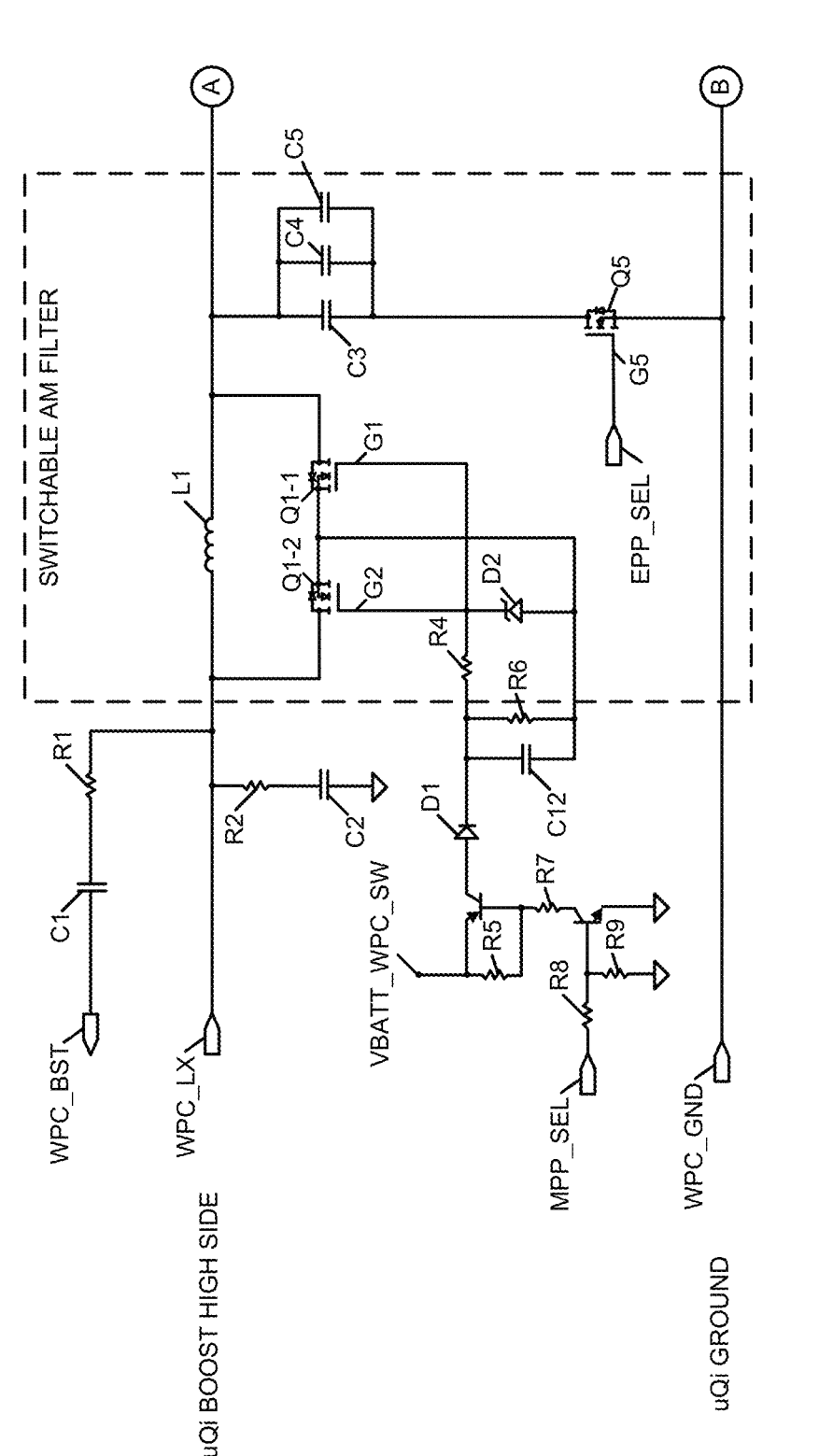
FIGS. 1A and 1B are block diagrams illustrating a circuit diagram of a wireless-charger transmitter according to some embodiments of the present disclosure.

An integrated circuit is described. This integrated circuit may include wireless-charger transmitter. The wireless-charger transmitter includes a driver circuit. Moreover, the wireless-charger transmitter selectively filters out an interference signal in a band of frequencies corresponding to AM radio. Note that the selective filtering may be performed by at least a filtering circuit. For example, the filtering circuit may include a low-pass filter. Moreover, the selective filtering using the filtering circuit may be based at least in part on a switching frequency of the wireless-charger transmitter. Furthermore, a filtering frequency associated with the filtering circuit (such as a 3 dB cutoff frequency of a low-pass filter) may be adjusted by selectively electrically coupling a set of capacitors in parallel with the filtering circuit.

By selectively filtering out the interference signal, these circuit techniques may allow the wireless-charger transmitter to have a reduce cost and complexity. For example, the wireless-charger transmitter may include fewer components. Notably, the wireless-charger transmitter may use a half-bridge configuration instead of a full-bridge configuration. (However, in other embodiments, the wireless-charger transmitter may use the full-bridge configuration.) Moreover, the wireless-charger transmitter may advantageously filter out the interference signal. For example, when the switching frequency generates multiple harmonics in the AM radio band, the wireless-charger transmitter may selectively electrically couple in the filtering circuit when the switching frequency is 128 kHz or in a Standard mode. More generally, the filtering circuit may be electrically coupled to the wireless-charger transmitter when the switching frequency is between 87 kHz to 205 kHz or is 360 kHz. Alternatively, the wireless-charger transmitter may selectively electrically decouple the filtering circuit when the switching frequency is 360 kHz or in an MPP mode. These capabilities may allow the wireless-charger transmitter to selectively filter out the interference signal when needed, but may selectively disable the filtering (and the resulting charging power loss) when it is not needed. Consequently, the circuit techniques may facilitate the increased use of the wireless-charger transmitter in a wide variety of systems, electronic devices and applications. For example, the wireless-charger transmitter may be used in vehicles that includes an AM radio.

We now describe embodiments of the circuit techniques. These circuit techniques may be performed using one or more integrated circuits are described. The one or more integrated circuits may include some or all of the components and associated functionality of a wireless-charger transmitter. Moreover, during operation, the one or more integrated circuits may selectively electrically couple (or decouple) a filtering circuit from the wireless-charger transmitter (e.g., using one or more switches, such as one or more FETs) based at least in part on a switching frequency of the wireless-charger transmitter.

Figure 1B:
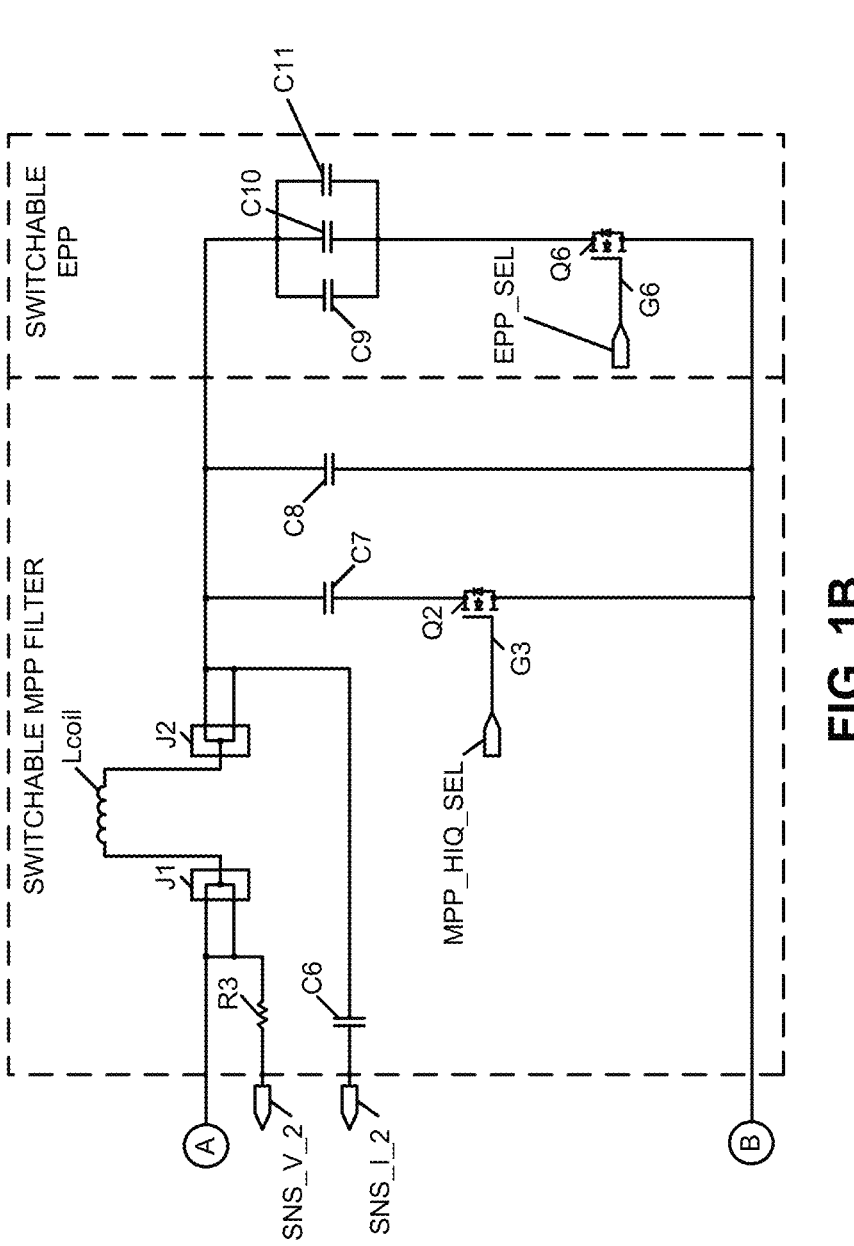

FIGS. 1A and 1B present block diagrams illustrating a circuit diagram of a wireless-charger transmitter 100 with a selectively switchable AM filter for electromagnetic interference reduction. In FIGS. 1A and 1B, an output of a driver circuit may be electrically coupled to a positive voltage, WPC_LX. For example, WPC_LX may be 16.5-40 V. Moreover, negative or ground may be electrically coupled to WPC_GND. Switchable MPP may include or may electrically couple to a charging coil (which is sometimes referred to as a 'transmission coil'), having inductance Lcoil. Furthermore, optional switchable Electrical Power Profile (EPP) circuit may include a matching circuit, so that wireless-charger transmitter 100 can be driven at or near a resonance frequency.

Additionally, the selectively switchable AM filter (such as a low-pass filter) may selectively switch one or more capacitors (such as three capacitors) in or out of wireless-charger transmitter 100. Note that inductor L1 and the three capacitors shown in FIG. 1A (C3, C4 and C5) may implement the low-pass filter in the selectively switchable AM filter.

In some embodiments, the three capacitors (C3, C4 and C5) are used to tune the 3 dB cutoff frequency of the low-pass filter. Notably, the capacitors may all be switchable in the switchable AM filter to adjust the 3 dB cutoff frequency based at least in part on variation in capacitance values. Moreover, switches Q1, Q2 and/or Q5 may be used to selectively electrically couple or decouple the low-pass filter to or from wireless-charger transmitter 100. This selective switching may reduce AM band noise or interference that is generated, while allowing the cost, number of components and complexity of wireless-charger transmitter 100 to be reduced.

For example, at a switching frequency of 128 kHz or in standard mode, the low-pass filter in the selective switchable AM filter may be used because harmonics are located in a band of frequencies corresponding to AM radio. More generally, the filtering circuit may be electrically coupled to the wireless-charger transmitter when the switching frequency is between 87 kHz to 205 kHz or is 360 kHz. Alternatively, at a switching frequency of 360 kHz or in the MPP mode, there may be only one harmonic in the band of frequencies corresponding to AM radio that is concerning (for electromagnetic interference). Consequently, the low-pass filter may be removed from the selective switchable AM filter, so more voltage can be driven across Lcoil.

Therefore, at a switching frequency of 128 kHz, switch Q1 may be open, and the inductor in the selective switchable AM filter may not be shorted out. Moreover, switch Q5 may be closed, so that inductor L1 and capacitors C3, C4 and C5 are included in the selective switchable AM filter.

Moreover, at a switching frequency of 260 Hz, switches Q1 and Q2 may be closed in order to short out inductor L1 and switch Q5 may be opened, so that capacitors C3, C4 and C5 are excluded from the selective switchable AM filter.

In some embodiments, selective switchable AM filter may include one or more additional sets of capacitors and switches in parallel with switch Q5 and capacitors C3, C4 and C5. This may allow the 3 dB cutoff frequency of selective switchable AM filter to be adjusted to account for variation in capacitance values. For example, there may be N instances of sets of capacitors (such as one or more capacitors electrically coupled in parallel), where N is a non-zero integer.

In some embodiments, C1 may be 0.022 μF, C2 may be 27000 pF, C3 may be 47 nF, C4 may be 100 nF, C5 may be 100 nF, C6 may be 22 pF, C7 may be 33 nF, C8 may be 68 nF, C9 may be 100 nF, C10 may be 100 nF, C11 may be 100 nF, C12 may be 10 nF, R1 may be 100Ω, R2 may be 5.6Ω, R3 may be 100 kΩ, R4 may be 1.69 kΩ, R5 may be 5.11 kΩ, R6 may be 33.2 kΩ, R7 may be 2.87 kΩ, R8 may be 2.2 kΩ, R9 may be 33.2 kΩ, and L1 may be 3.30 μH. Moreover, WPC_LX may have a maximum current of 7A.

Note that the numerical values for wireless-charger transmitter 100 in FIGS. 1A and 1B are illustrative examples. In other embodiments, different numerical values may be used. Moreover, wireless-charger transmitter 100 in FIGS. 1A and 1B may include fewer or additional components, two or more components may be combined into a single component, a single component may be implemented using two or more separate components, and/or a position of one or more components may be changed.

In some embodiments, a voltage across Lcoil may be approximately constant. This may be achieved by varying a duty cycle. When the duty cycle is 50% (or more), the voltage across Lcoil may be varied. The maximum voltage across Lcoil may be a sine wave having an amplitude of 60-70 Vpp.

We now describe embodiments of a method. FIG. 2 presents a flow diagram illustrating an example of a method 200 for performing wireless charging using a wireless-charger transmitter, such as wireless-charger transmitter 100 in FIGS. 1A and 1B. During operation, the wireless-charger transmitter may output, from a driver circuit, a charging signal to at least a transmission coil (operation 210). Then, the wireless-charger transmitter may selectively electrically couple (or decouple) a filter circuit to (or from) the wireless-charger transmitter based at least in part on a switching frequency of the wireless-charger transmitter (operation 212).

In some embodiments of method 200, there may be additional or fewer operations. Moreover, the order of the operations may be changed, and/or two or more operations may be combined into a single operation. For example, the wireless-charger transmitter may perform wireless charging.

The disclosed wireless-charger transmitter and the circuit techniques can be (or can be included in) any electronic device or system. For example, the electronic device may include: a cellular telephone or a smartphone, a tablet computer, a laptop computer, a notebook computer, a personal or desktop computer, a netbook computer, a media player device, an electronic book device, a MiFi® device, a wireless-charger device, a wireless-charging system, a smartwatch, a wearable computing device, a portable computing device, a consumer-electronic device, an access point, a router, a switch, communication equipment, test equipment, a vehicle, a ship, an airplane, a car, a truck, a bus, a motorcycle, manufacturing equipment, farm equipment, construction equipment, or another type of electronic device.

Although specific components are used to describe the embodiments of the wireless-charger transmitter and/or the integrated circuit that includes the wireless-charger transmitter, in alternative embodiments different components and/or subsystems may be present in the wireless-charger transmitter and/or the integrated circuit that includes the wireless-charger transmitter. Thus, the embodiments of the wireless-charger transmitter and/or the integrated circuit that includes the wireless-charger transmitter may include fewer components, additional components, different components, two or more components may be combined into a single component, a single component may be separated into two or more components, one or more positions of one or more components may be changed, and/or there may be different types of components. For example, a given branch in the wireless-charger transmitter may include one or more insulated-gate bipolar transistors (IGBTs) instead of the one or more FETs. Note that one or more of the capacitors, the one or more FETs, the one or more IGBT, and/or the transmission coil may be external components to the wireless-charger transmitter. In some embodiments, the one or more FETs or the one or more IGBTs may be included on a second integrated circuit that is separate from an integrated circuit that includes the wireless-charger transmitter. Additionally, in some embodiments, a wireless-charger power stage or the driver circuit may be an external component to the wireless-charger transmitter.

Moreover, the circuits and components in the embodiments of the wireless-charger transmitter and/or the integrated circuit that includes the wireless-charger transmitter may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar. Note that electrical coupling or connections in the preceding embodiments may be direct or indirect. In the preceding embodiments, a single line corresponding to a route may indicate one or more single lines or routes.

As noted previously, an integrated circuit may implement some or all of the functionality of the circuit techniques. This integrated circuit may include hardware and/or software mechanisms that are used for implementing functionality associated with the circuit techniques.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the circuit techniques may be implemented using program instructions that are executed by a processor or in firmware in an integrated circuit.

Moreover, while examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising a wireless-charger transmitter, wherein the wireless-charger transmitter comprises a driver circuit electrically coupled to a transmission coil; and
    wherein the wireless-charger transmitter is configured to selectively filter out an interference signal in a band of frequencies corresponding to amplitude modulated (AM) radio;
    wherein the selective filtering is performed by at least a filtering circuit;
    wherein the selective filtering is based at least in part on a switching frequency of the wireless-charger transmitter; and
    wherein, when the switching frequency has a first value, the filtering circuit is electrically coupled to the wireless-charger transmitter.

2. The integrated circuit of claim 1, wherein the filtering circuit comprises a low-pass filter.

3. The integrated circuit of claim 1, wherein the first value comprises 128 kHz.

4. The integrated circuit of claim 1, wherein, when the switching frequency has a second value, the filtering circuit is electrically decoupled from the wireless-charger transmitter.

5. The integrated circuit of claim 4, wherein the second value comprises 360 kHz.

6. The integrated circuit of claim 1, wherein the filtering circuit is selectively electrically coupled to or decoupled from the wireless-charger transmitter using one or more switches.

7. The integrated circuit of claim 1, wherein the integrated circuit is configured to adjust a filtering frequency associated with the filtering circuit by selectively electrically coupling a set of capacitors in parallel with the filtering circuit.

8. The integrated circuit of claim 7, wherein the set of capacitors comprises a parallel arrangement of one or more capacitors.

9. The integrated circuit of claim 7, wherein the filtering frequency comprises a 3 dB cutoff frequency of a low-pass filter.

10. The integrated circuit of claim 1, wherein the wireless-charger transmitter comprises a half-bridge circuit that is electrically coupled to the driver circuit.

11. An electronic device, comprising:
    an integrated circuit, wherein the integrated circuit comprises a wireless-charger transmitter;
    wherein the wireless-charger transmitter comprises a driver circuit electrically coupled to a transmission coil; and
    wherein the wireless-charger transmitter is configured to selectively filter out an interference signal in a band of frequencies corresponding to amplitude modulated (AM) radio;
    wherein the selective filtering is performed by at least a filtering circuit;
    wherein the selective filtering is based at least in part on a switching frequency of the wireless-charger transmitter;
    wherein, when the switching frequency has a first value, the filtering circuit is electrically coupled to the wireless-charger transmitter; and
    wherein, when the switching frequency has a second value that is larger than the first value, the filtering circuit is electrically decoupled from the wireless-charger transmitter.

12. The electronic device of claim 11, wherein the integrated circuit is configured to adjust a filtering frequency associated with the filtering circuit by selectively electrically coupling a set of capacitors in parallel with the filtering circuit.

13. The electronic device of claim 12, wherein the set of capacitors comprises a parallel arrangement of one or more capacitors.

14. A method for performing wireless charging, comprising:
    by a wireless-charger transmitter:
    outputting, from a driver circuit, a charging signal to at least a transmission coil; and
    selectively electrically coupling a filter circuit to the wireless-charger transmitter based at least in part on a switching frequency of the wireless-charger transmitter, wherein, when the switching frequency has a first value, the method comprises electrically coupling the filtering circuit to the wireless-charger transmitter; and
    wherein, when the switching frequency has a second value that is larger than the first value, the method comprises electrically decoupling the filtering circuit from the wireless-charger transmitter.

15. The electronic device of claim 11, wherein the first value comprises 128 kHz.

16. The electronic device of claim 11, wherein the second value comprises 360 kHz.

17. The method of claim 14, wherein the first value comprises 128 kHz.

18. The method of claim 14, wherein the second value comprises 360 kHz.

19. The method of claim 14, wherein the method comprises adjusting a filtering frequency associated with the filtering circuit by selectively electrically coupling a set of capacitors in parallel with the filtering circuit.

20. The method of claim 19, wherein the filtering frequency comprises a 3 dB cutoff frequency of a low-pass filter.

* * * * *